United States Patent
Lahmann et al.

(10) Patent No.: US 6,796,397 B2
(45) Date of Patent: Sep. 28, 2004

(54) METHOD OF ACTIVATING A PASSENGER SAFETY APPLICATION IN A MOTOR VEHICLE

(75) Inventors: Robert Lahmann, Stuttgart (DE); Michael Roelleke, Leonberg-Hoefingen (DE); Bernhard Mattes, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 77 days.

(21) Appl. No.: 10/143,315

(22) Filed: May 10, 2002

(65) Prior Publication Data

US 2002/0189883 A1 Dec. 19, 2002

(30) Foreign Application Priority Data

May 12, 2001 (DE) .......................................... 101 23 215

(51) Int. Cl.[7] .............................................. B60K 28/14
(52) U.S. Cl. ....................... 180/282; 280/735; 280/756; 701/45; 701/46; 701/47; 200/61.52; 200/52 A; 340/440
(58) Field of Search ........................ 180/282; 280/735, 280/756; 701/45, 46, 47; 200/43.08, 56 R, 61.45 R, 61.52, 61.57, 52 A, 61.58 B; 340/457, 440, 429, 438, 457.1

(56) References Cited

U.S. PATENT DOCUMENTS

| | | | | |
|---|---|---|---|---|
| 4,784,237 A | * | 11/1988 | Condne et al. ............. 180/268 |
| 5,261,506 A | * | 11/1993 | Jost ............................. 180/282 |
| 5,510,986 A | * | 4/1996 | Williams ..................... 701/38 |
| 5,610,337 A | * | 3/1997 | Nelson ........................ 73/651 |
| 5,620,202 A | * | 4/1997 | Gray et al. ................. 280/735 |
| 5,890,084 A | * | 3/1999 | Halasz et al. ................. 701/45 |
| 5,957,988 A | * | 9/1999 | Osajda et al. ................. 701/45 |
| 6,005,479 A | * | 12/1999 | Ide ............................. 340/438 |
| 6,038,495 A | * | 3/2000 | Schiffmann .................... 701/1 |
| 6,141,604 A | * | 10/2000 | Mattes et al. .................. 701/1 |
| 6,167,335 A | * | 12/2000 | Ide et al. ...................... 701/45 |
| 6,192,305 B1 | * | 2/2001 | Schiffmann .................. 701/45 |
| 6,390,498 B1 | * | 5/2002 | Francis et al. ............. 280/735 |
| 6,424,897 B1 | * | 7/2002 | Mattes et al. ................. 701/45 |
| 6,428,118 B1 | * | 8/2002 | Blosch ....................... 303/9.64 |
| 6,496,763 B2 | * | 12/2002 | Griessbach .................. 701/45 |
| 6,560,519 B2 | * | 5/2003 | Williams et al. .............. 701/45 |

FOREIGN PATENT DOCUMENTS

| | | |
|---|---|---|
| DE | 36 09 839 | 9/1987 |
| DE | 196 09 176 | 9/1987 |
| DE | 19642525 | * 10/1996 |
| DE | 19609176 | * 9/1997 |
| DE | 196 32 836 | 11/1997 |
| DE | 19632836 | * 11/1997 |
| DE | 19632363 | * 1/1998 |
| DE | 196 32 363 | 1/1998 |
| DE | 19651124 | * 5/1998 |
| DE | 196 51 124 | 5/1998 |
| DE | 196 50 629 | 6/1998 |
| DE | 19650629 | * 6/1998 |
| GB | 2 335 521 | 9/1999 |

* cited by examiner

*Primary Examiner*—Michael J. Carone
*Assistant Examiner*—John Richardson
(74) *Attorney, Agent, or Firm*—Kenyon & Kenyon

(57) ABSTRACT

A method for activating a passenger safety application in a vehicle involves a rotational acceleration sensor device which is used to obtain a measurement of the rotational acceleration $\alpha_x$ of the vehicle, e.g., about an axis of rotation x parallel to the longitudinal axis of the vehicle. The results of this measurement are analyzed by a computing unit for evaluating the vehicle situation with respect to its surrounding. Activation of a suitable safety application is performed in the event that the analysis indicates that a rollover event of the vehicle is imminent.

19 Claims, 2 Drawing Sheets

METHOD OF ACTIVATING A PASSENGER SAFETY APPLICATION IN A MOTOR VEHICLE

FIELD OF THE INVENTION

The present invention relates to a method of activating a passenger safety application in a motor vehicle, e.g., in a rollover event.

BACKGROUND INFORMATION

Single-vehicle accidents account for more than one-third of all accidents. In these single-vehicle accidents, most occupants become fatalities in a rollover.

Conventional passenger safety applications include roll bar systems for protecting occupants in the event of a vehicle rollover. In a rollover involving a convertible, these roll bar systems should ensure the survival space and protect the occupants from physical impact with the road surface or the ground. In a typical example embodiment, these devices are situated directly behind the vehicle seats and include a roll bar which, in the normal state, is pre-tensioned against the force of a spring, but in the event of danger, it is deployed by sensors on the vehicle and may be moved into a final protective position.

Furthermore, the present patent applicant is aware of safety systems configured as window airbags, which are deployed in the event of a rollover.

For deployment of the appropriate safety application, prompt detection of a rollover is necessary. Such an event is detected by rotational rate sensors, where a possible rollover may be predicted by converting rotational energy into potential energy at angles of rotation of the vehicle in the range between approximately 25° and 55°.

One disadvantage of this conventional principle is the fact that systems including rotational rate sensors have cut-off frequencies of approximately 30 Hz, so a deployment decision may be made in a period of time of approximately 300 ms.

In ROSE events (ROSE=rotation sensing), i.e., rollover events due to driving over a ramp or a slope, this period of time for a deployment decision is sufficient to allow timely deployment of the respective safety application.

However, transverse acceleration of a vehicle occurs at the beginning of a SOIL-TRIP event, very rapidly moving the occupants out of their original positions in the vehicle. Such events may occur, for example, due to a change in the road surface (change in $\mu$), a lateral movement on a soft road surface subsequently getting stuck due to striking a hard edge or a curb or the like. The time lag varies according to the maneuver, which then causes the occupants to be shifted in the direction of movement until contact with the side window occurs, e.g., on the side of the corresponding axis of rotation. Since a deployment decision must be made much faster in such an event than in a ROSE incident, the cut-off frequencies of the rotational rate sensors are no longer sufficient to promptly deploy the appropriate passenger safety application.

SUMMARY

Although it may be used with any safety applications, the present invention and the problem on which it is based are explained with respect to a passenger safety system in a motor vehicle in a rollover event.

The method according to the present invention may provide the advantage that higher measuring frequencies may be achieved and thus it is possible to make a timely deployment decision even in a rapidly proceeding rollover event.

The idea on which the present invention is based is for a rotational acceleration sensor device to measure the rotational acceleration of the rotational movement of the vehicle, e.g., about an axis of rotation parallel to the longitudinal axis of the vehicle. The results of this measurement are then analyzed by a computing unit for an evaluation of the vehicle situation with respect to its environment, and in case the analysis indicates an imminent rollover event of the vehicle, a suitable safety application is activated.

Therefore, it is possible to greatly increase the cut-off frequency or measuring frequency of the measurement operation, and timely activation of an appropriate safety application is thus possible even in a rapidly proceeding rollover event.

According to an example embodiment, the passenger safety application is configured as a window airbag and/or a roll bar. This offers adequate protection to the occupants of a convertible to protect their bodies from impact with the road surface and also to protect the occupants from impact of their bodies against the respective side window.

According to another example embodiment, the measured rotational acceleration is converted by a computing unit and an algorithm into other physical quantities, e.g., the rotational speed and/or the expected angle of rotation of the rollover event. It is thus possible to calculate, merely by measurement of the rotational acceleration, whether an angle of rotation of the vehicle which is sufficiently large for a rollover may be expected. In this case it is possible to decide promptly whether to deploy a safety application.

According to another example embodiment, an activation decision is made by a deployment decision unit within a time period of 100 ms.

According to another example embodiment, the axis of rotation is defined by the points of contact of the corresponding wheels of the vehicle. However, it should be pointed out here that other axes of rotation are also conceivable and may be handled according to the same principle.

According to another example embodiment, additional acceleration sensor devices are used to measure at least one translatory acceleration perpendicular to the direction of travel, the measurement results are taken into account by the computing unit for the analysis of the vehicle situation.

According to another example embodiment, the computing unit and an algorithm are used to detect a displacement of the center of gravity of the vehicle in a certain direction on the basis of the measured translatory accelerations, and the appropriate safety application on the respective side is activated if necessary. Through such a detection it is possible to ascertain toward which side the occupants are moving due to the rollover event and to deploy or activate the suitable safety applications accordingly.

According to another example embodiment, the course of the rotational acceleration may be classified on the basis of vehicle testing. Such test results may be stored in a storage device, e.g., in the computing unit, and compared with the instantaneous measurement results. Additional information regarding the immediately subsequent event may be derived from such additional information.

According to another example embodiment, high frequency measurement components may also be analyzed from the measured rotational acceleration. By integration of the rotational acceleration, it is possible to produce rotational rate signals which have already been low-pass filtered by the integration operation. This facilitates early detection of a rollover event and thus permits timely activation of a safety application.

According to another example embodiment, the rotational acceleration sensor device is additionally equipped with a rotational rate output for supplying the rotational rate to an analyzing unit. For example, in the case of ROSE events, this signal may be sent to the known system so that an additional sensor system has been created.

According to another example embodiment, in addition to the rotational acceleration sensor device, a rotational rate sensor is also provided. This may additionally supply the measured rotational speed to the existing system for a ROSE event. Here again, the system according to the present invention represents an additional sensor system for the known system.

According to another example embodiment, the physical quantities obtained from the rotational acceleration are sent to another decision path, the individual paths are introduced into the deployment decision unit for a decision regarding deployment of a safety application according to an "and" criterion or an "or" criterion. Thus, various analyses of different physical quantities may be taken into account jointly for a deployment decision.

According to another example embodiment, the rotational acceleration sensor device is configured as a micromechanical rotational acceleration sensor. However, other rotational acceleration sensors are also conceivable.

According to another example embodiment, the cut-off frequency or measuring frequency of the rotational acceleration sensor device is greater than 100 Hz. This permits a response to the start of a rollover event within a very short period of time.

Example embodiments of the present invention are illustrated in the drawing and explained in greater detail in the following description.

DETAILED DESCRIPTION

The same reference numbers in the figures denote the same components or those having the same function.

Figure 1:
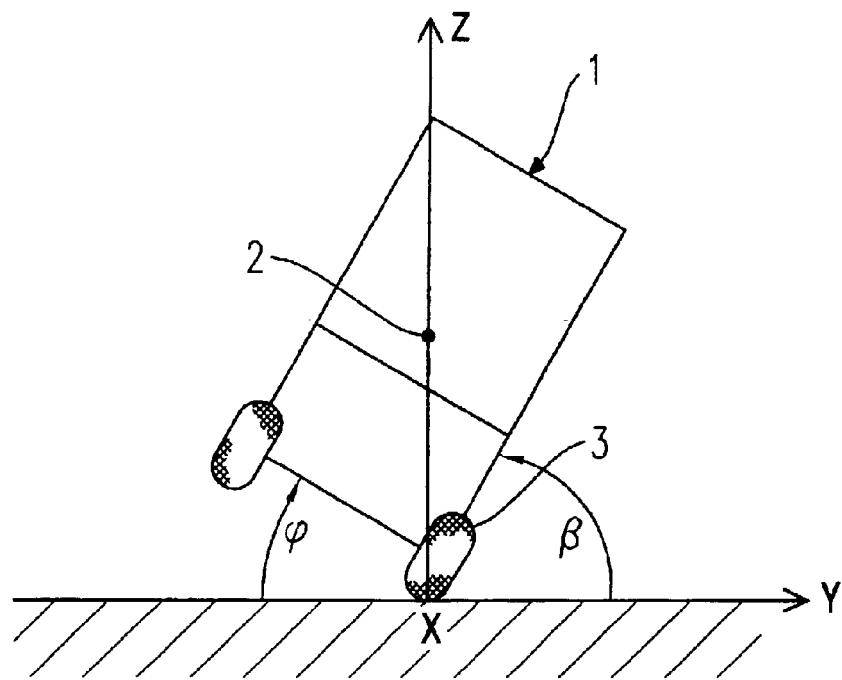
FIG. 1 illustrates a schematic diagram of a vehicle rollover event.

FIG. 1 illustrates a schematic diagram of a rollover event involving a vehicle 1. Vehicle 1 is defined as a rigid body and is represented graphically in FIG. 1 by a rectangle. Depending on the coordinates of center of gravity 2 in the fixed Cartesian coordinate system x, y and z, where the x axis runs perpendicular to the y axis and the z axis runs along the longitudinal axis of the vehicle, there is a vehicle-specific roll angle $\beta$ or critical angle $\beta$ at which vehicle 1 is in an unstable equilibrium situation. Center of gravity 2 in this situation is vertically above ground contact point x, which is defined by the points of contact of vehicle wheels 3 which are still on the ground and runs parallel to the longitudinal axis of the vehicle.

It should be pointed out here that the axis of rotation may also have a different orientation. The principle explained here and the required algorithms may easily be transformed to axes of rotation having a different orientation.

A rollover or tilting event usually occurs when angle $\beta$ drops below a critical threshold. Then center of gravity 2 of vehicle 1 is outside the contact area of the vehicle. However, minor forces acting on vehicle 1 determine whether or not a complete rollover event will occur. Reality has shown that situations occur in which the unstable equilibrium situation is exceeded, but nevertheless the vehicle does not roll over. The reason for this, among other things, is that the response of the steering system, which may be influenced by unpredictable intervention on the part of the driver, and movement of the occupants causing the center of gravity to shift.

However, if vehicle-specific critical angle $\beta$ is used as a deployment threshold for a safety application, this yields deployment times which would not permit timely activation of a safety application. Therefore, dynamic deployment thresholds which take into account the future response of the vehicle and calculate it in advance are necessary.

Such algorithms are conventional and therefore need no further explanation here. Essentially, expected angle of rotation $\phi_{max}$ of vehicle 1 is calculated in the sense of an energy analysis from a physical quantity measured initially, e.g., rotational speed $\omega_x$ about a longitudinal axis of the vehicle.

Figure 2:
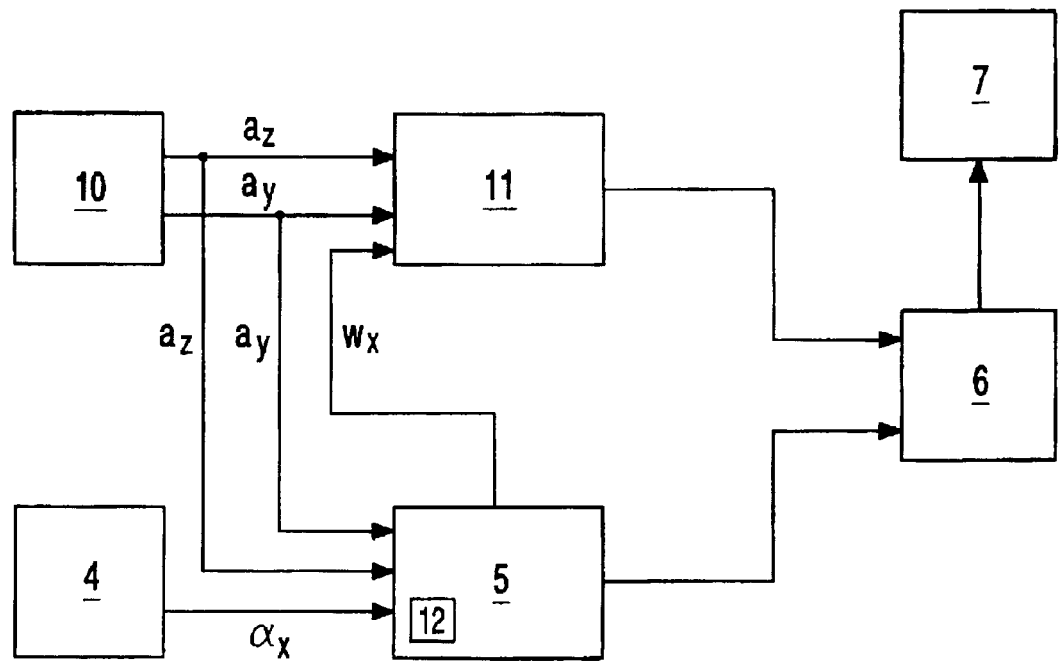
FIG. 2 illustrates a block diagram of a system for activation of a passenger safety application according to a first example embodiment of the present invention.

FIG. 2 illustrates a block diagram of the system according to a first example embodiment of the present invention on the basis of which the method of activation of a passenger safety application 7 is explained in greater detail below.

A rotational acceleration sensor 4 mounted in vehicle 1, e.g., a micromechanical rotational acceleration sensor, measures rotational acceleration $\alpha_x$ occurring instantaneously about axis of rotation x at the beginning of a possible rollover event, i.e., when center of gravity 2 of vehicle 1 is raised or lowered. Such changes in position of the center of gravity are initiated, for example, by a change in the road surface, a lateral movement on a soft road surface with subsequently getting stuck, hitting a curb, or the like. Depending on the type of cause, different decelerations or rotational accelerations $\alpha_x$ and lateral accelerations $a_y$ occur. These accelerations are responsible for displacement of the occupants.

Measured rotational acceleration $\alpha_x$ is transmitted to a computing unit 5, which is connected to rotational acceleration sensor 4. Rotational acceleration $\alpha_x$ may be converted by integration in computing unit 5 into other physical quantities such as rotational speed $\omega_x$ or angle of rotation $\phi$ and analyzed with conventional algorithms. Finally, such algorithms may be used to calculate a maximum angle of rotation $\phi_{max}$ at which the tilting movement will presumably occur on the basis of rotational acceleration $\alpha_x$. If this angle of rotation $\phi_{max}$ causes rotation of vehicle 1 beyond a critical predetermined angle $\beta$, then a corresponding passenger safety application 7 may be activated by a deployment decision unit 6 connected to computing unit 5.

In addition, the course of the rotational acceleration may be classified, this is done on the basis of vehicle tests, with the results stored in a memory 12 in computing unit 5. This classification describes the energy introduced into vehicle wheels 3 and the chassis of vehicle 1. Rotational acceleration $\alpha_x$ is a measure of the rotational movement occurring due to transverse deceleration $a_y$.

According to the present example embodiment, additional acceleration sensors 10 are provided for a measurement of translatory accelerations $a_z$ and $a_y$ in the system. According to the present example embodiment, measured translatory accelerations $a_y$ and $a_z$ are additionally transmitted as threshold values to the rotational acceleration path, as illustrated in FIG. 2. Computing unit 5 converts these values into additional physical quantities, e.g., distance and/or velocity. Additional information regarding the vehicle situation may be derived from these values, e.g., the direction in which center of gravity 2 of vehicle 1 is being displaced, i.e., toward which side a possible rollover event is imminent. Thus, if one of the measured or calculated quantities exceeds a corresponding threshold value, i.e., signaling an imminent rollover event toward a certain side of the vehicle, then a corresponding signal is delivered to deployment decision unit 6, which then activates respective passenger safety application 7.

Thus, on the basis of these measured values of rotational acceleration $\alpha_x$ and translatory accelerations $a_y$ and $a_z$, a decision is made as to whether any safety application 7 is to be activated, and if so, which one in particular. This may be advantageous in the case of irreversible safety applications because only those that are required are activated in a targeted manner.

The system described above may be combined with the conventional algorithm for ROSE events. In this algorithm, translatory accelerations $a_y$ and $a_z$, which are accelerations in a direction perpendicular to the longitudinal axis of vehicle 1, are the input quantities. Rotational speed $\omega_x$, which may be calculated by integration from rotational acceleration $\alpha_x$ thus determined, may also be introduced into this path by computing unit 5.

The system-related deceleration is lower due to a significantly higher cut-off frequency of rotational acceleration sensor 4 than is the case with rotational rate sensors, said frequency is greater than 100 Hz, and thus a faster response to the start of a rollover event is possible. High-frequency signal components may also be analyzed in this algorithm. Special filtering with a subsequent threshold comparison, i.e., an estimate of the extent to which a rollover event is imminent, thus permits early detection. A deployment decision is thus available after only approximately 100 ms. Deployment decision unit 6 may make a decision for deployment of a passenger safety application 7 merely on the basis of the signals of computing unit 5 or in combination with the signals of analyzing unit 11.

Figure 3:
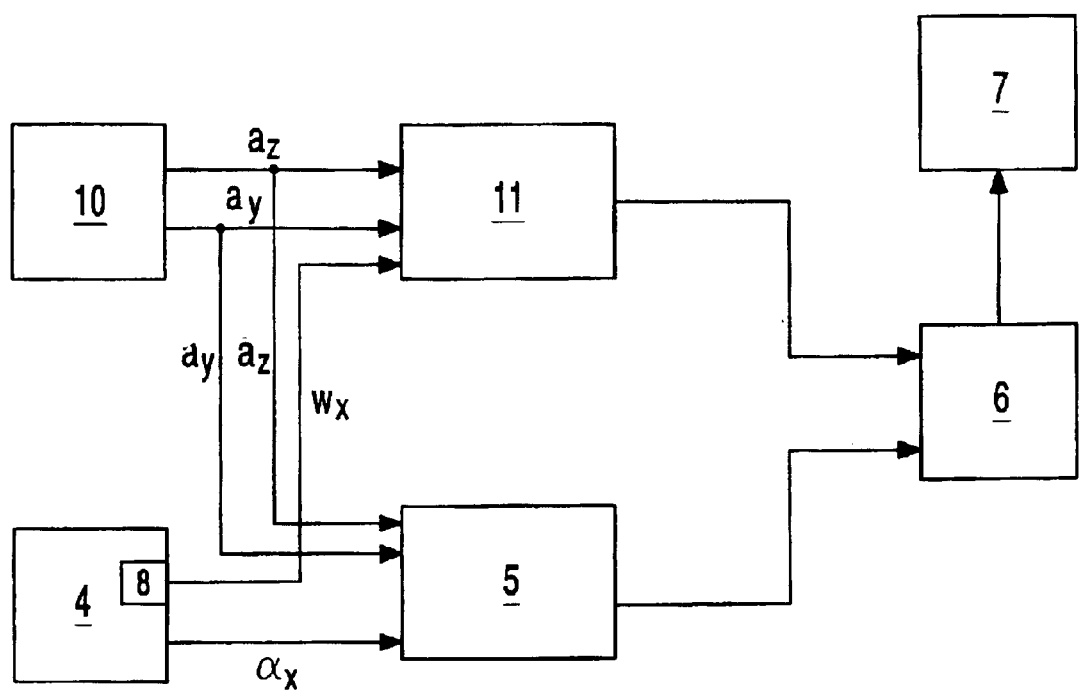
FIG. 3 illustrates a block diagram of a system for activation of a passenger safety application according to a second example embodiment of the present invention.

FIG. 3 illustrates a block diagram of a system for activation of a passenger safety application according to a second example embodiment of the present invention.

Mistakes may occur in conversion of physical quantities, e.g., in computing unit 5 in converting rotational acceleration $\alpha_x$ into respective rotational speed $\omega_x$ by integration due to the large dynamic range of rotational acceleration sensor 4, so that rotational acceleration sensor 4 also has a rotational rate output 8.

Thus, corresponding rotational speed value $\omega_x$ is transmitted to analyzer unit 11 without error, so the following two analysis paths, namely first the rotational acceleration path via computing unit 5 and secondly the rotational speed path via analyzing unit 11, may be supplied with different measured quantities and with different cut-off frequencies from same sensor 4. Deployment decision unit 6 thus analyzes the two separate paths together and activates appropriate safety application 7 either according to an "and" decision (both paths signal an imminent rollover event) or according to an "or" decision (one of the two paths signals an imminent rollover event).

Although the present invention has been described above on the basis of example embodiments, the present invention is not limited to these example embodiments, but instead may be modified in a variety of manners. For example, instead of additional rotational rate output 8, a separate rotational rate sensor may also be provided for direct input of rotational speed $\omega_x$. Furthermore, different types of rotational acceleration sensors may be used for measuring rotational acceleration $\alpha_x$.

What is claimed is:

1. A method for activating a passenger safety application in a vehicle, comprising:

using a rotational acceleration sensor device to obtain a measurement of a rotational acceleration of the vehicle about an axis of rotation parallel to a longitudinal axis of the vehicle;

analyzing the measurement result using a computing unit for evaluating a vehicle situation with respect to its surroundings; and activating the passenger safety application if the analysis indicates that a rollover event of the vehicle is imminent.

2. The method according to claim 1, wherein the passenger safety application comprises at least one of a window airbag and a roll bar.

3. The method according to claim 1, further comprising:

converting the measurement result of the rotational acceleration, by the computing unit using an algorithm, into at least one physical quantity including at least one of a rotational speed and an expected angle of rotation.

4. The method according to claim 1, wherein the axis of rotation is defined by points of contact of corresponding vehicle wheels.

5. The method according to claim 1, wherein the rotational acceleration sensor device has a rotational rate output for delivering a rotational speed.

6. The method according to claim 1, further comprising:

using a rotational rate sensor to measure rotational rate of the vehicle.

7. The method according to claim 1, wherein filtering and a threshold comparison permits early detection of the rollover event, the threshold comparison includes an estimate of an extent to which the rollover event is imminent.

8. The method according to claim 1, wherein the passenger safety application is activated in the activating step via a deployment decision unit based on signals of at least one of the computing unit and an analyzing unit.

9. The method according to claim 1, wherein the rotational acceleration is a measure of rotational movement occurring due to transverse deceleration.

10. A method for activating a passenger safety application in a vehicle, comprising:

using a rotational acceleration sensor device to obtain a measurement of a rotational acceleration of the vehicle about an axis of rotation parallel to a longitudinal axis of the vehicle;

analyzing the measurement result using a computing unit for evaluating a vehicle situation with respect to its surroundings; and activating the passenger safety application if the analysis indicates that a rollover event of the vehicle is imminent;

wherein the passenger safety application is activated by a deployment decision unit within a time period of 100 ms.

11. A method for activating a passenger safety application in a vehicle, comprising:

using a rotational acceleration sensor device to obtain a measurement of a rotational acceleration of the vehicle about an axis of rotation parallel to a longitudinal axis of the vehicle;

analyzing the measurement result using a computing unit for evaluating a vehicle situation with respect to its surroundings;

activating the passenger safety application if the analysis indicates that a rollover event of the vehicle is imminent; and using at least one additional rotational acceleration sensor device to obtain a measurement of at least one translatory acceleration perpendicular to the axis of rotation; and wherein the measurement result of the at least one translatory acceleration perpendicular to the axis of rotation is taken into account for evaluating the vehicle situation by the computing unit.

12. The method according to claim 11, further comprising:

detecting a displacement of a center of gravity of the vehicle in a certain direction, by the computing unit using an algorithm, on the basis of the at least one translatory acceleration.

13. A method for activating a passenger safety application in a vehicle, comprising:

using a rotational acceleration sensor device to obtain a measurement of a rotational acceleration of the vehicle about an axis of rotation parallel to a longitudinal axis of the vehicle;

analyzing the measurement result using a computing unit for evaluating a vehicle situation with respect to its surroundings; and activating the passenger safety application if the analysis indicates that a rollover event of the vehicle is imminent;

wherein a course of the rotational acceleration is classified on the basis of vehicle tests.

14. The method according to claim 13, wherein the classification of the course of the rotational acceleration defines energy introduced into vehicle wheels and a chassis of the vehicle.

15. A method for activating a passenger safety application in a vehicle, comprising:

using a rotational acceleration sensor device to obtain a measurement of a rotational acceleration of the vehicle about an axis of rotation parallel to a longitudinal axis of the vehicle;

analyzing the measurement result using a computing unit for evaluating a vehicle situation with respect to its surroundings; and activating the passenger safety application if the analysis indicates that a rollover event of the vehicle is imminent;

wherein at least one high-frequency measurement component is analyzed from the measured rotational acceleration.

16. A method for activating a passenger safety application in a vehicle, comprising:

using a rotational acceleration sensor device to obtain a measurement of a rotational acceleration of the vehicle about an axis of rotation parallel to a longitudinal axis of the vehicle;

analyzing the measurement result using a computing unit for evaluating a vehicle situation with respect to its surroundings;

activating the passenger safety application if the analysis indicates that a rollover event of the vehicle is imminent;

converting the measurement result of the rotational acceleration, by the computing unit using an algorithm, into at least one physical quantity including at least one of a rotational speed and an expected angle of rotation;

sending the at least one physical quantity obtained from the measured rotational acceleration along a first decision path; and sending the measured rotational acceleration along a second decision path;

wherein the first and second decision paths converge into a deployment decision unit for a decision regarding deployment of the safety application according to one of an "and" criterion and an "or" criterion.

17. A method for activating a passenger safety application in a vehicle, comprising:

using a rotational acceleration sensor device to obtain a measurement of a rotational acceleration of the vehicle about an axis of rotation parallel to a longitudinal axis of the vehicle;

analyzing the measurement result using a computing unit for evaluating a vehicle situation with respect to its surroundings; and activating the passenger safety application if the analysis indicates that a rollover event of the vehicle is imminent;

wherein the rotational acceleration sensor device is a micromechanical rotational acceleration sensor.

18. A method for activating a passenger safety application in a vehicle, comprising:

using a rotational acceleration sensor device to obtain a measurement of a rotational acceleration of the vehicle about an axis of rotation parallel to a longitudinal axis of the vehicle;

analyzing the measurement result using a computing unit for evaluating a vehicle situation with respect to its surroundings; and activating the passenger safety application if the analysis indicates that a rollover event of the vehicle is imminent;

wherein a measurement frequency of the rotational acceleration sensor device is greater than 100 Hz.

19. A method for activating a passenger safety application in a vehicle, comprising:

using a rotational acceleration sensor device to obtain a measurement of a rotational acceleration of the vehicle about an axis of rotation parallel to a longitudinal axis of the vehicle;

analyzing the measurement result using a computing unit for evaluating a vehicle situation with respect to its surroundings;

activating the passenger safety application if the analysis indicates that a rollover event of the vehicle is imminent; and converting the measurement result of the rotational acceleration, by the computing unit using an algorithm, into at least one physical quantity including at least one of a rotational speed and an expected angle of rotation;

wherein the at least one physical quantity includes a maximum angle of rotation at which a tilting movement occurs based on the rotational acceleration and the passenger safety application is activated in the activating step when the maximum angle of rotation causes rotation of the vehicle beyond a critical predetermined angle.

* * * * *